United States Patent
Lapp et al.

(10) Patent No.: US 8,245,687 B2
(45) Date of Patent: Aug. 21, 2012

(54) PROFILED CONNECTING ROD BORE WITH MICRO-DIMPLES

(75) Inventors: Michael T. Lapp, Bloomfield, MI (US); Roger A. Krause, Howell, MI (US); Dan H. Dinu, Windsor (CA)

(73) Assignee: Mahle International GmbH (DE)

( * ) Notice: Subject to any disclaimer, the term of this patent is extended or adjusted under 35 U.S.C. 154(b) by 413 days.

(21) Appl. No.: 12/683,659

(22) Filed: Jan. 7, 2010

(65) Prior Publication Data

US 2011/0162614 A1 Jul. 7, 2011

(51) Int. Cl.
*F02B 75/32* (2006.01)
*B21D 53/84* (2006.01)

(52) U.S. Cl. .................. 123/197.3; 29/888.09; 74/579 E

(58) Field of Classification Search ................ 123/197.3; 74/579 E; 29/888.09
See application file for complete search history.

(56) References Cited

U.S. PATENT DOCUMENTS

| | | | |
|---|---|---|---|
| 3,161,185 | A | 12/1964 | Justinien et al. |
| 3,830,341 | A | 8/1974 | Davies et al. |
| 5,248,878 | A | 9/1993 | Ihara |
| 6,250,275 | B1 | 6/2001 | Bock et al. |
| 6,481,389 | B2 | 11/2002 | Suzuki et al. |
| 6,513,477 | B1 | 2/2003 | Gaiser et al. |
| 6,565,258 | B1 | 5/2003 | Yamada et al. |
| 7,107,893 | B2 | 9/2006 | Weinkauf et al. |
| 7,118,279 | B2 | 10/2006 | Fujita et al. |
| 7,305,960 | B2 | 12/2007 | Zvonkovic |
| 2003/0128903 | A1 | 7/2003 | Yasuda et al. |
| 2004/0228554 | A1 | 11/2004 | Fujita et al. |
| 2007/0204746 | A1 | 9/2007 | Issler et al. |

FOREIGN PATENT DOCUMENTS

| | | |
|---|---|---|
| DE | 1208118 B | 12/1965 |
| DE | 3144720 A1 | 5/1983 |
| DE | 4034808 A1 | 5/1991 |
| DE | 19700339 A1 | 7/1997 |
| DE | 19911339 A1 | 9/2000 |
| DE | 10029950 A1 | 1/2002 |
| DE | 10233263 A1 | 2/2004 |
| DE | 10247130 A1 | 4/2004 |
| DE | 10305461 A1 | 8/2004 |
| DE | 102004024576 A1 | 12/2005 |
| DE | 102005043217 A1 | 3/2007 |
| DE | 102006013399 A1 | 7/2007 |
| EP | 1167737 A2 | 1/2002 |
| FR | 1300937 A | 8/1962 |
| GB | 2319582 A | 5/1998 |
| GB | 2330788 A | 5/1999 |
| JP | 06173937 A | 6/1994 |
| JP | 09049489 A | 2/1997 |
| JP | 10131729 A | 5/1998 |
| KR | 1055150 | 4/2001 |
| KR | 3050301 | 6/2003 |
| KR | 3090296 | 11/2003 |
| RU | 2204735 C1 | 5/2003 |
| WO | WO-92/07200 A1 | 4/1992 |
| WO | WO-2007073720 A1 | 7/2007 |

*Primary Examiner* — Noah Kamen
(74) *Attorney, Agent, or Firm* — Rader, Fishman & Grauer PLLC

(57) ABSTRACT

A connecting rod and methods for making the same are disclosed. A connecting rod may include a shaft extending between a piston pin end and a crankshaft pin end. The piston pin end generally defines a bore opening extending along an axis. The connecting rod further includes a bore surface formed integrally with the piston pin end and extending about an inner circumference of the bore opening. The bore surface may define a plurality of dimples that extend axially along the bore surface. The bore opening further may further include profiled surfaces adjacent opposing ends of the bore opening.

21 Claims, 5 Drawing Sheets

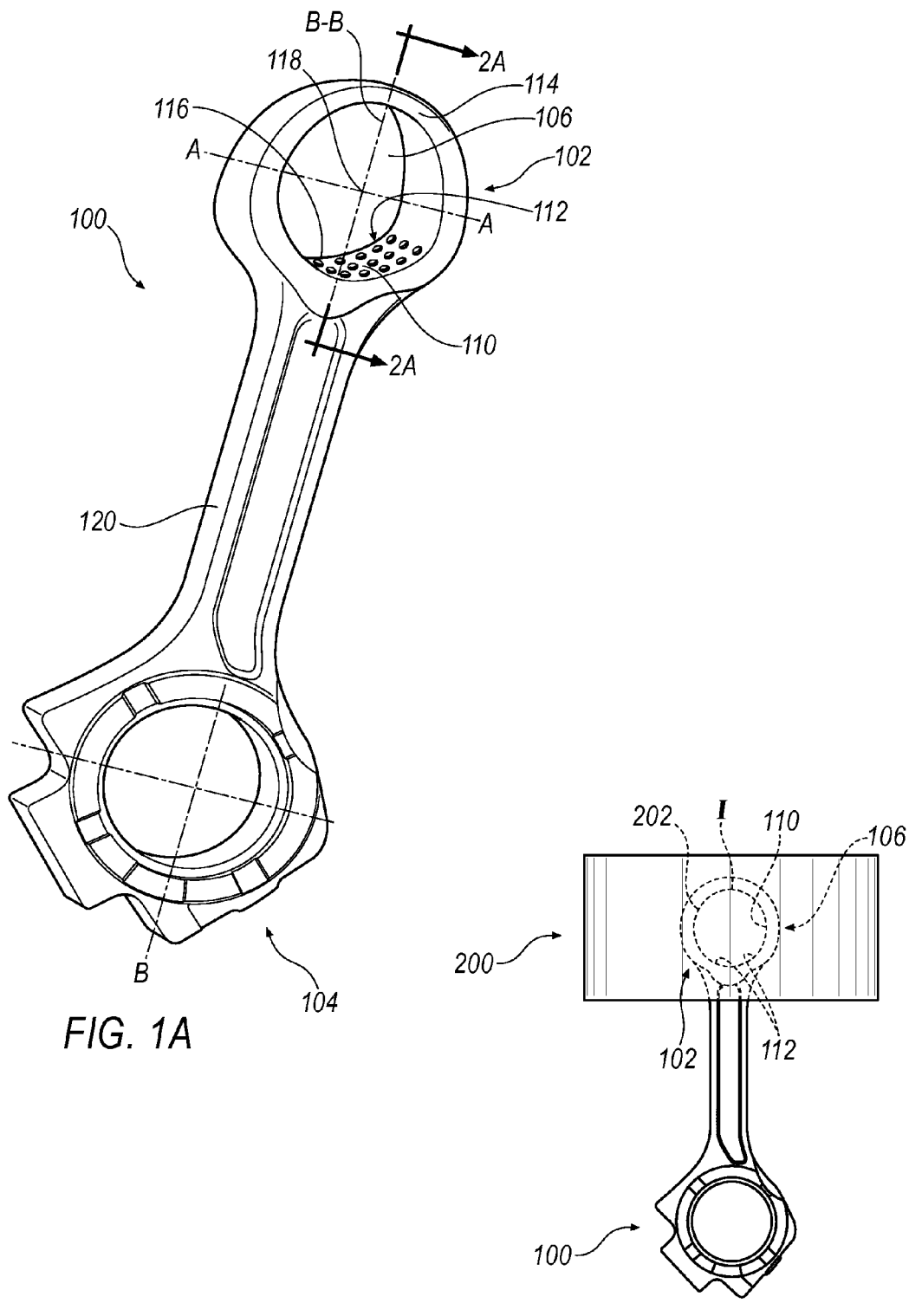

PROFILED CONNECTING ROD BORE WITH MICRO-DIMPLES

BACKGROUND

The traditional internal combustion engine relies on connecting rods for transmitting combustion power from a piston main body to a crankshaft of the engine, thereby converting the linear motion of the piston main body to rotational motion at the crankshaft. Combustion power is generated from the intermittent ignition of a combustible such as gasoline that is injected into the combustion chamber, which creates extreme pressures that are applied to the piston and connecting rod. In particular, the interface between the piston pin bore of the connecting rod and the piston pin may experience substantially continuous radial loads during operation even though only a limited amount of a lubricant may be available for reducing contact friction at the interface.

In an attempt to more evenly distribute radial loads across the piston pin bore surface, the piston pin bore surface may be profiled such that the piston pin bore better accommodates bending of the piston pin under load. However, this may undesirably also reduce the limited amount of lubricant present between the piston pin and the piston pin bore, as the piston pin may generally "squeeze" lubricant out of the interface during piston pin bending. Efforts to improve lubrication of the joint, e.g., by providing a bearing with or without undulations between the piston pin and piston pin bore or by machining undulations in the piston pin bore surface or bearing that allow lubricant to remain within the piston pin and piston pin bore interface during pin deflection, are generally costly and increase part count and/or complexity of the manufacturing process.

Accordingly, there is a need for a connecting rod having an improved lubricated interface between the connecting rod and piston pin while still distributing piston pin loads to minimize connecting rod and piston pin wear and minimizing production complexity.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

FIG. 1A is a perspective view of an exemplary connecting rod;

FIG. 1B is a side view of a piston assembly including the exemplary connecting rod of FIG. 1A;

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

According to various exemplary illustrations, a connecting rod, piston assembly and a method of making a connecting rod are disclosed. A connecting rod may include a shaft extending between a piston pin end and a crankshaft pin end. The piston pin end generally defines a bore opening extending along an axis. The connecting rod further includes a bore surface formed integrally with the piston pin end and extending about an inner circumference of the bore opening. The bore surface may define a plurality of dimples that extend axially along the bore surface. The bore opening may further include profiled surfaces adjacent opposing ends of the bore opening.

An exemplary method of making a connecting rod may generally include forming a shaft that has a piston pin end and a crankshaft pin end, and forming a bore opening in the piston pin end that extends along an axis. The exemplary method may further include forming a plurality of dimples extending axially along the bore opening, and profiling opposing ends of the bore opening to form an integral bore surface. The integral bore surface may extend about an inner circumference of the bore opening.

Figure 2A:
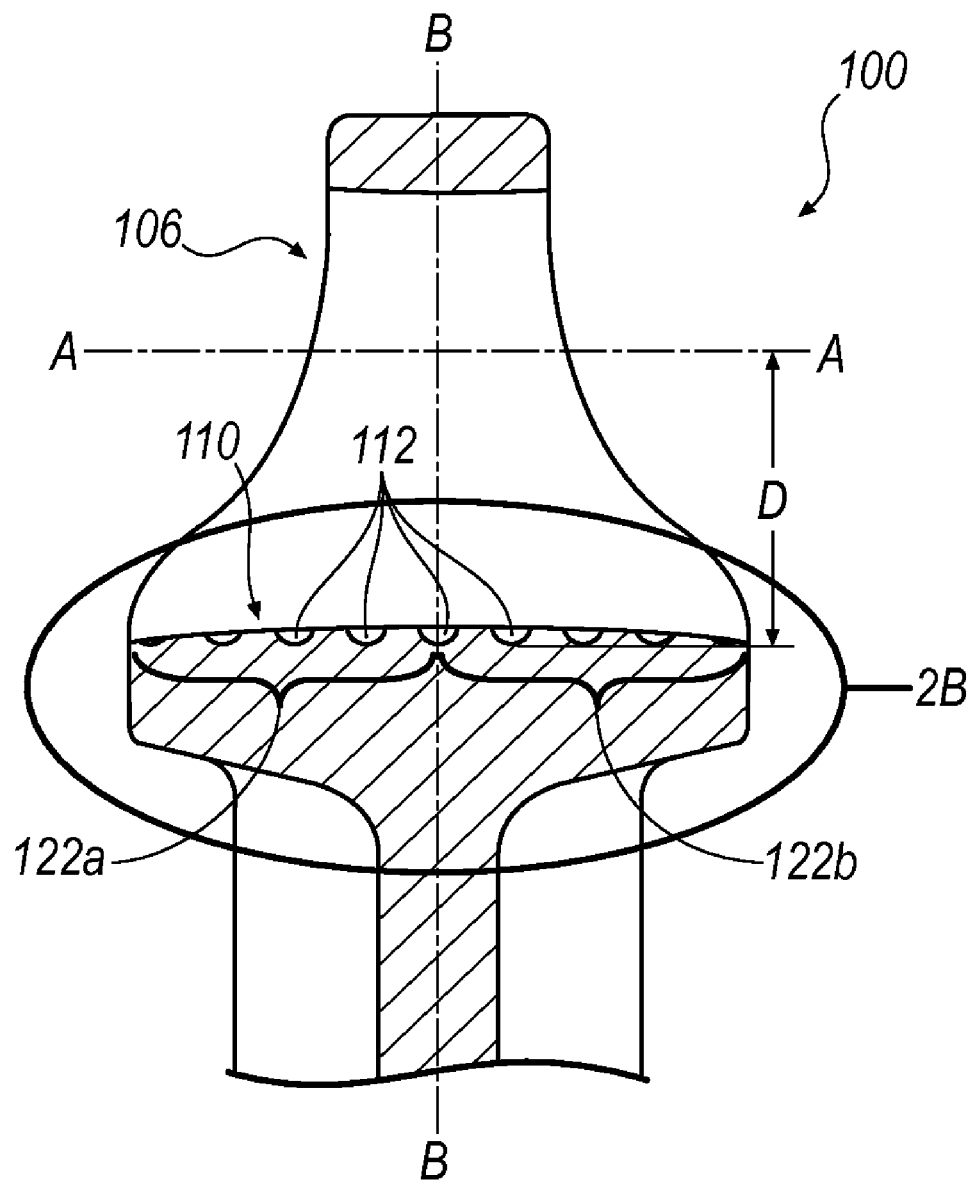
FIG. 2A is a partial cutaway view of the exemplary connecting rod of FIG. 1A.
Figure 2B:
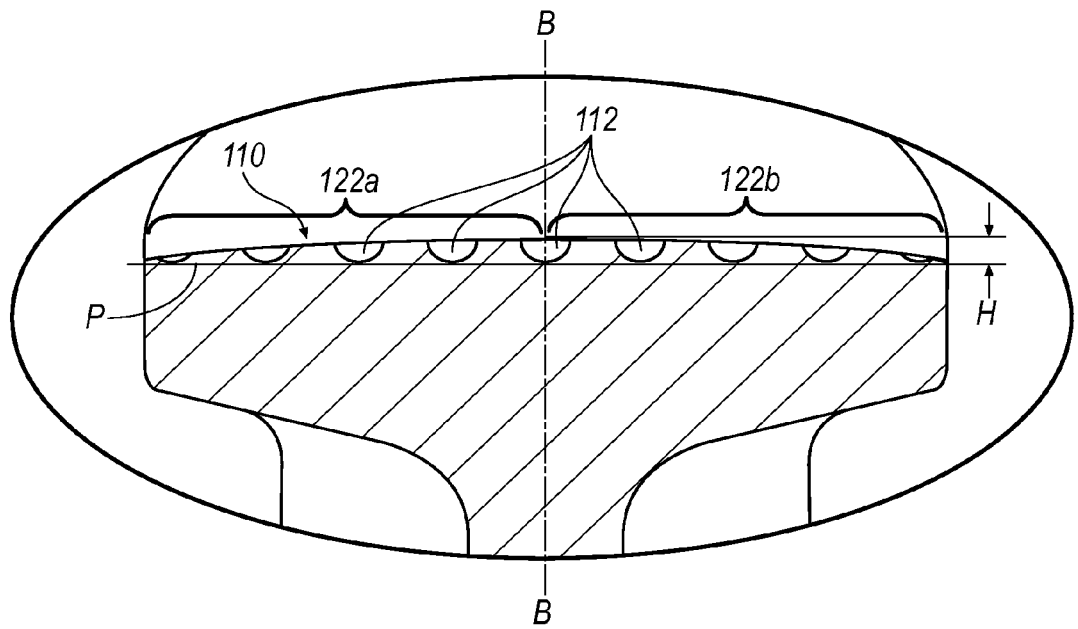
FIG. 2B is a closeup of the cutaway view of FIG. 2A.

FIGS. 1A, 2A, and 2B illustrate an exemplary connecting rod 100. The connecting rod 100 includes a piston pin or small end 102 and a crankshaft or large end 104. The piston pin end 102 includes a piston pin bore opening 106 that defines an axis A-A extending through the piston pin bore 106, and a piston pin bore surface 110. The piston pin bore surface 110 includes a plurality of lubricating depressions or dimples 112 disposed axially along the piston pin bore surface 110. The piston pin bore surface 110 extends between a front face 114 and a rear face 116 of the piston pin end 102. The bore surface 110 may be formed integrally with the piston pin end 102 of the connecting rod 100, such that the bore surface 110 extends about an inner circumference of the piston pin bore 106.

The connecting rod 100 includes a shaft 120 extending between the piston pin end 102 and the crankshaft end 104. The shaft 120 may include any generally quadrangular section, such as, for example, a generally I-shaped section as illustrated, a square cross-section, a generally rectangular cross section, or any other cross-section that is convenient. The ends 102 and 104 of the connecting rod 100 cooperate to generally define a longitudinal axis B-B of the connecting rod 100.

The piston pin bore surface 110 includes a plurality of dimples 112 generally distributed about the piston pin bore surface 110, e.g., axially within the piston pin bore 106 as best seen in FIGS. 2A and 2B. The dimples 112 may be depressions or indentations located in the piston pin bore surface 110. As shown in FIGS. 2A and 2B, each dimple 112 generally forms a rounded, convex depression in the bore surface 110. The particular shape and/or configuration of a dimple 112 may vary according to a method used to form the dimples 112, as further explained below. For example, the dimples 112 are illustrated having a generally rounded bottom surface, as may result in certain machining or working operations used to form the dimples 112. Alternatively, the dimples 112 may have a generally flat bottom surface, e.g., such that the dimples form a cylindrical shape with respect to the bore surface 110. The dimples may also have any depth, e.g., with respect to the bore surface 110, that is convenient, and be provided in any number that is convenient. In one exemplary illustration, the 30-40 dimples are provided that have a depth of between five and eighty (80) microns (μm). The dimples 112 may be used to accumulate a lubricant, such as, for example, oil, during operation when the connecting rod 100 is assembled in a piston assembly. The dimples 112, as will be described further below, may be formed via any process that is convenient. Merely as examples, dimples 112 may be formed in a metal working operation such as a needle printer, an eroding process, or with a laser forming process where the dimples 112 are formed by impinging a laser beam upon the piston pin bore surface 110.

Turning now to FIG. 1B, the connecting rod 100 is shown assembled with a piston. More specifically, the connecting rod 100 may be assembled to a piston main body 200 by way of a piston pin 202. In other words, a piston pin 202 may be received within a piston bore defined by the piston main body 200, and also within the piston pin bore 106 of the connecting rod 100, thereby generally securing the connecting rod 100 to the piston 200. In one example the piston 200 may be assembled within a cylinder of an internal combustion engine. An interface I between the piston pin bore 106 of the connecting rod 100 and the piston pin 202 may experience substantially continuous radial loads from the piston pin 202 during operation. The dimples 112 may be provided in an effort to enhance lubrication between the piston pin 202 and the piston pin bore surface 110, as the lubrication typically accumulates within the dimples 112, thereby increasing the amount of lubrication at the interface I, and particularly about a circumferential extent of the dimples 112.

Turning now to FIGS. 2A and 2B, the connecting rod 100 is shown including two profiled surfaces 122a, 122b that are disposed generally adjacent to opposing ends of the bore opening 106. In some illustrations, the profiled surfaces 122a, 122b may be at the opposing ends of the bore opening 106. As best seen in FIG. 2A, the profiled surfaces 122a and 122b generally taper away from the axis A-A of the bore opening 106 moving in a direction from a longitudinally central portion of the bore opening 106 to the ends of the bore opening 106.

As best seen in FIG. 2B, a bottommost portion of at least a subset of the dimples 112 may cooperate to define a generally common plane P. The plane P may be generally parallel to the axis A-A of the bore opening 106. The plane P thus also may define a predetermined distance D that the plane P is spaced away from the axis A-A. The forming of the dimples 112 to define a common plane may result where a material removal operation is used to form the dimples 112 prior to a profiling process associated with the bore surface 110, with the material removal operation removing a substantially identical amount of material from the bore surface 110 to define each dimple 112.

While the dimples 112 may cooperate to define a common plane P as described above, the dimples 112 may generally define different heights along the axial length of the bore opening 106, for example as measured from the common plane P. For example, as best seen in FIG. 2B, dimples 112 that are located toward the longitudinally central portion of the bore opening 106, i.e. closer to the longitudinal axis B-B, may have a greater height measured in a direction generally parallel to the longitudinal axis B-B than dimples 112 that are closer to an end of the bore opening 106. As shown in FIG. 2B, the tallest dimple 112, positioned generally centrally within the axial extent of the bore opening 106, has a maximum height H. Each successive dimple 112, moving in a direction toward either end of the bore opening 106, has a progressively smaller height due to a taper of the profiled surfaces 122a, 122b.

The dimples 112 may also define different diameters, for example as measured along the profiled surfaces 112a, 112b. As best seen in FIG. 2B, dimples 112 located at or closer to the longitudinal axis B-B in an axially central portion of the bore opening 106 define a larger diameter across the profiled surfaces 122a, 122b than dimples 112 that are closer to either of the opposing ends of the bore opening 106. Furthermore, the dimples 112 may define different volumes or depressions in the bore surface 110. As seen in FIG. 2B, the dimples 112 at or closer to the longitudinal axis B-B have a larger volume, and thus greater fluid capacity, than dimples 112 that are positioned closer to either of the opposing ends of the bore opening 106.

Figure 2C:
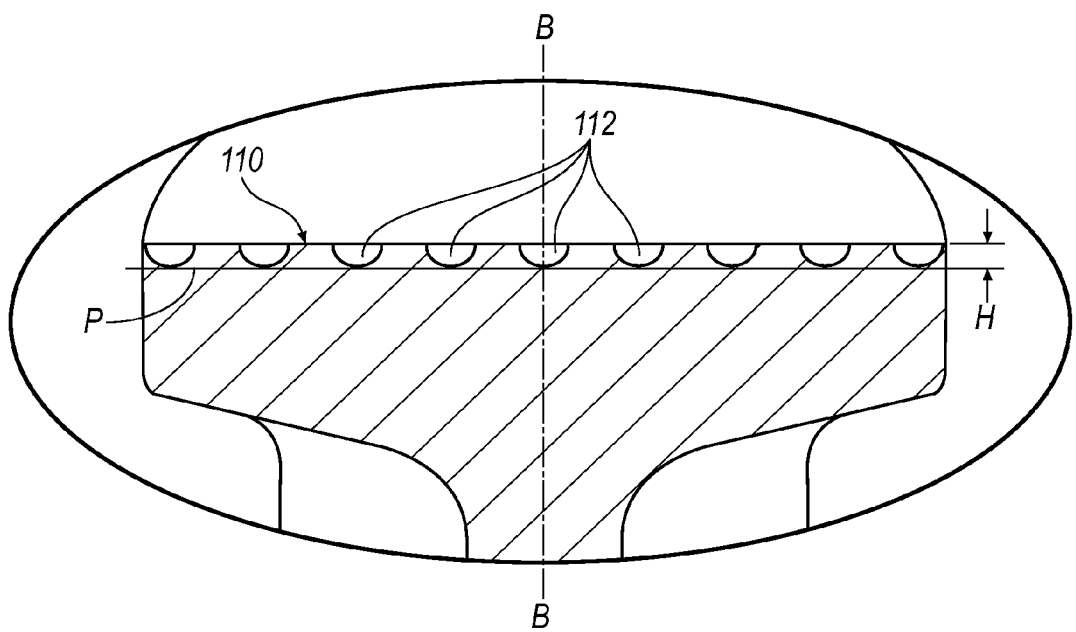
FIG. 2C is a closeup cutaway view of an exemplary connecting rod shown prior to a profiling operation.

The profiled surfaces 122 each generally taper away from the axis A-A moving in a direction away from the axial center of the bore opening 106 and toward either end of the bore opening 106. The tapering configuration of the profiled surfaces 122 may be formed in any manner that is convenient, e.g., by machining. Furthermore, as described further below, the profiled surfaces may be formed after dimples 112 are initially formed in the bore surface 110. For example, as best seen in FIG. 2C, a plurality of dimples 112 are formed in the surface 110, which is not profiled. Dimples 112 formed in the surface 110 prior to a profiling operation may thus also be machined during the profiling operation, thereby reducing a relative height of dimples closer to an end of the bore opening 106.

As shown in FIGS. 2A and 2B, the two profiled surfaces 122a, 122b generally extend axially to the center of the bore opening 106, with the profiled surfaces 122 meeting in an axially central portion of the bore opening 106. Alternatively, the central portion of the bore opening 106 may define a generally cylindrical surface, such that each profiled surface extends from the generally cylindrical portion to its respective end of the bore openings 106.

Figure 3:
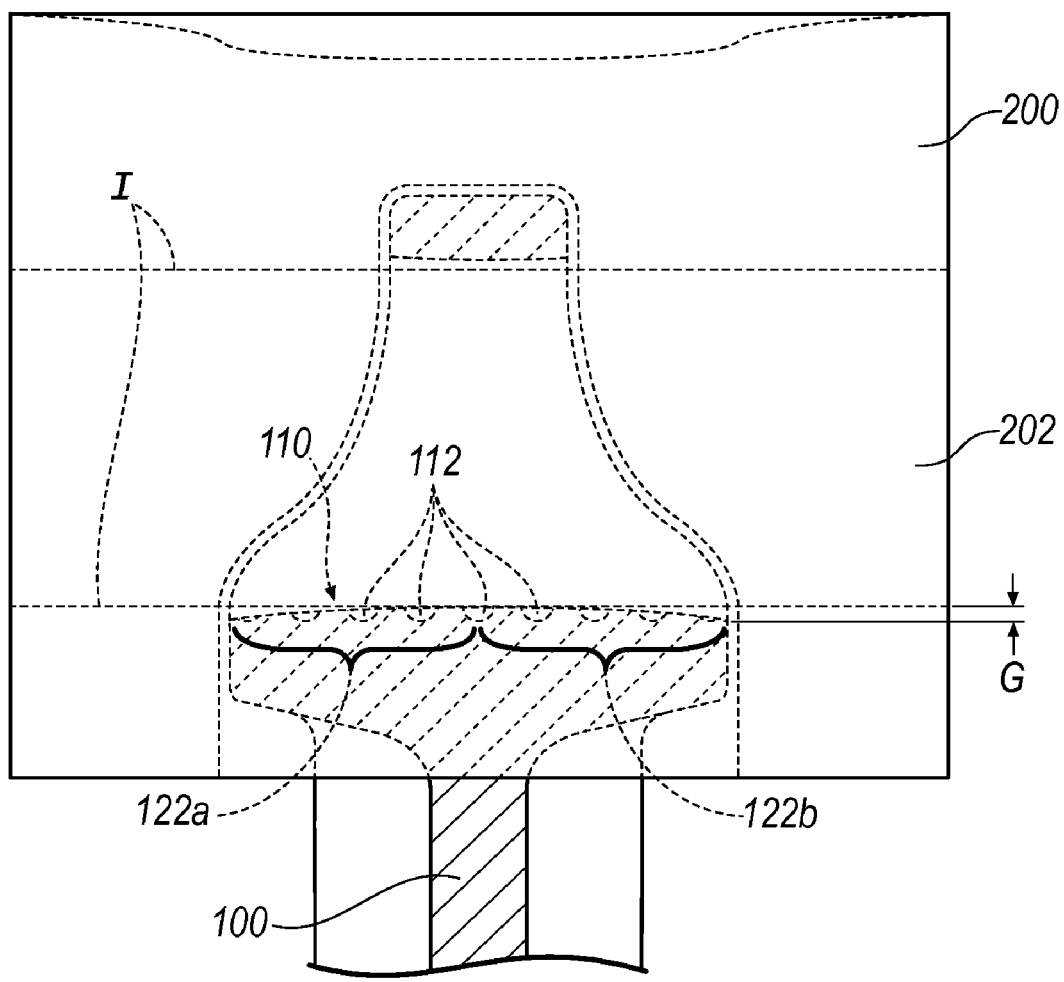
FIG. 3 is a partial cutaway view of an exemplary connecting rod assembled with a piston and piston pin.

As best seen in FIG. 3, a gap G may be defined between the piston pin 202 and each of the profiled surfaces 122 adjacent each opposing end of the bore opening 106 when the piston pin 202 is not under load, e.g., when an engine employing the piston 200 is not in operation. The profiled surfaces 122 of the bore opening 106 may advantageously be shaped to correspond to a bending shape of the piston pin 202 during operation of the connecting rod, thereby allowing for improved distribution of the radial loads of the piston pin upon the bore surface 110 of the connecting rod 100. Accordingly, the gap G may be determined based upon an expected deflection or bending of the piston pin 202 during the reciprocal motion of the piston 200 typical during operation. The gap G and taper of the profiled surfaces 122 may advantageously allow oil or other coolant to intrude into the interface I between the piston pin 202 and the connecting rod 100, e.g., when the piston pin 202 is not at a maximum deflection due to bending. Furthermore, while oil may be forced out of the interface I when the piston pin 202 is bending, and particularly when the piston pin 202 is at a maximum deflection due to bending, the dimples 112 may each accumulate at least a small amount of the oil, thereby improving hydro-dynamic lubrication and tribology of the interface I. The profiled surfaces 122 may thus function to generally improve load distribution of the piston pin 202, while the dimples 112 improve overall lubrication of the interface I between the piston pin 202 and the connecting rod 100.

The provision of dimples 112 having a greater volume and thus a greater fluid carrying capacity in an axially central region of the bore opening 106, as described above, also provides a further lubrication advantage. Generally, the piston pin 202 remains in constant contact with the bore opening 106 at the axially central region of the bore opening 106, e.g., at or near the longitudinal axis B-B of the connecting rod 100, because bending or deflection of the piston pin 202 is a minimum in this region during operation. The greater fluid capacity of the dimples 112 located nearer the axial center of the bore opening 106 may therefore allow accumulation of a greater amount of lubricant, thereby enhancing lubrication of the interface between the piston pin 202 and the bore opening 106 in the axially central region where lubricant would not otherwise accumulate to the extent possible in other regions of the bore opening that benefit from the greater gap between the profiled surfaces 122a, 122b and the piston pin 202, e.g., adjacent the opposing ends of the bore opening 106.

Figure 4:
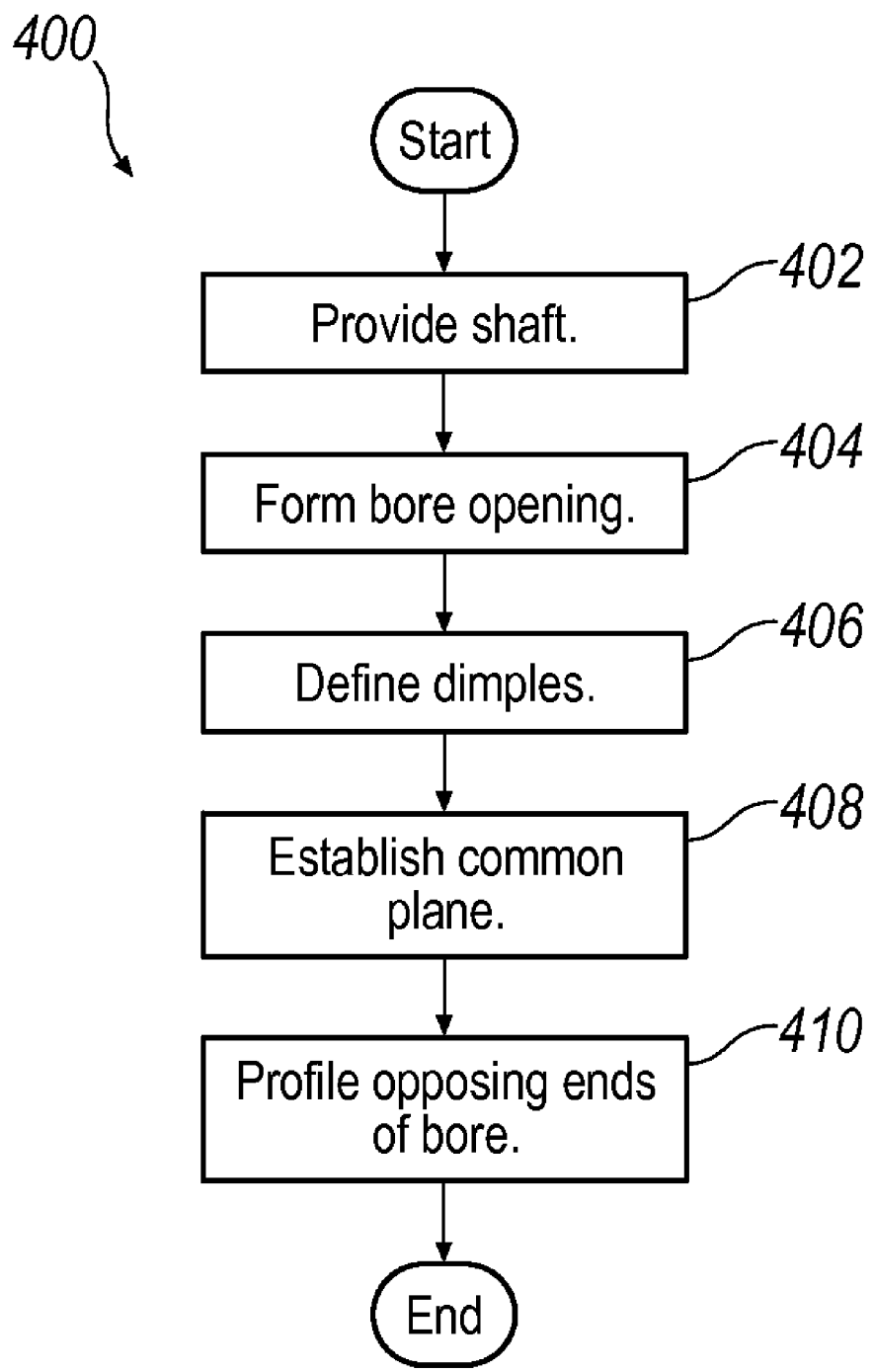
FIG. 4 is an process flow diagram for an exemplary method of making a connecting rod.

Turning now to FIG. 4, a process 400 for forming a connecting rod is described. Process 400 may generally begin at step 402, where a shaft 120 is provided. For example, as described above a shaft 120 may be formed with a piston pin end 102 and a crankshaft pin end 104 in any forming operation that is convenient, e.g., forging. Process 400 may then proceed to step 404.

In step 404, a bore opening 106 is formed in the piston pin end 102. For example, as described above, the bore opening 106 may be formed in the piston pin end 102 such that it defines an axis A-A that extends generally centrally within the bore opening 106. The bore opening 106 may define an integral bore surface 110 extending about an inner circumference of the bore opening 106. Process 400 may then proceed to step 406.

In step 406, material may be removed from the bore surface to define a plurality of dimples 112 extending axially along the bore opening 106. As described above the dimples 112 may be formed by any method that is convenient. Merely as examples, a metal working process may be used to form the dimples 112 by removing material from the bore opening 106. Alternatively, a laser may be used that impinges upon the bore surface 110 to generally ablate the bore surface 110 and create the dimples 112. A laser forming process may be less costly than machining processes typically employed for forming operations associated with the connecting rod surfaces, and may be generally more adaptable than these machining operations to changes in dimple configuration, e.g., size, spacing, etc. The particular type of laser and power, wavelength, positioning, etc. of the laser may be determined based at least in part upon a material selected for the connecting rod. Process 400 may then proceed to step 408.

In step 408, a generally common plane may be established with a bottommost portion of at least a subset of the dimples 112. For example, as described above each of the dimples 112 may establish a generally common plane P. The plane P may be substantially parallel to the axis A-A. Additionally, the plane P may establish a predetermined distance D that the plane P is spaced away from axis A-A. The dimples 112 may be formed such that they extend circumferentially about at least a portion of the bore opening 106, in addition to their axial extent through the bore opening 106. For example, as best seen in FIG. 1A, the dimples 112 generally extend about a lower portion of the bore surface 110. In another exemplary approach the dimples 112 may be formed such that they extend about the entire circumference of the bore opening 106 and/or bore surface 110.

As described above, the dimples 112 may be formed prior to a profiling operation associated with the bore surface 110. Accordingly, the dimples 112 may each initially define substantially identical heights H and/or diameters and/or volumes, as shown in FIG. 3. Process 400 may then proceed to step 410.

In step 410, opposing ends of the bore opening 106 are profiled to form an integral bore surface 110 that extends about an inner circumference of the bore opening 106. The opposing ends of the bore opening 106 may be profiled in any method that is convenient. For example, the bore surfaces 110 may generally be machined such that the ends of the bore surface 110 generally taper away from the axis A-A and define a gap G with the piston pin 202 after the connecting rod 100 is assembled with the piston pin 202.

The profiling of the ends of the bore opening 106 may occur after the forming of the dimples 112. By profiling the bore opening 106 after the forming of the plurality of dimples 112, the dimples 112 nearer the center of the bore opening 106, i.e., closer to longitudinal axis B-B of the connecting rod 100, will generally have a greater height than dimples 112 that are closer to the outer ends of the bore opening 106. Additionally, as shown in FIG. 2B the dimples 112 may define progressively smaller heights moving in a direction from an axially central portion of the bore opening 106 towards either of the outer ends of the bore opening. Further, as described above dimples 112 positioned at or closer to the longitudinal axis B-B of the connecting rod 100 may define a greater volume or fluid carrying capacity than dimples 112 positioned further away from the longitudinal axis B-B of the connecting rod 100.

As described above, the profiled surfaces 122 may be formed such that they each extend from their respective end of the bore opening 106 and meet together in an axially central portion of the bore opening, i.e., nearest the longitudinal axis B-B of the connecting rod 100. Alternatively, the profiled surfaces 122 may be formed only on the ends of the bore opening 106, such that a generally cylindrical portion remains within the bore opening 106 in the axially central portion of the bore opening 106.

While the dimples 112 have been described herein as being formed on the bore surface 110 of a connecting rod 100, other surfaces interfacing with a piston pin, crankshaft pin, or connecting rod may have dimples formed thereon to promote lubrication of these interfaces in a similar manner as described herein for the connecting rod bore surface 110. For example, piston pin bore surfaces of a piston body may be formed with dimples in a similar manner as described for the connecting rod bore surface 110. Furthermore, the piston pin bore surfaces may be profiled to accommodate piston pin deflection in a similar manner as described herein for the connecting rod bore surfaces.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A connecting rod, comprising:
   a shaft extending between a piston pin end and a crankshaft pin end, said piston pin end defining a bore opening extending along an axis;
   a bore surface formed integrally with said piston pin end and extending about an inner circumference of said bore opening, said bore surface defining a plurality of dimples extending axially along said bore surface; and
   wherein said bore opening includes profiled surfaces adjacent opposing ends of said bore opening.

2. The connecting rod of claim 1, wherein a bottommost portion of at least a subset of said dimples cooperate to define a generally common plane.

3. The connecting rod of claim 2, wherein said generally common plane is substantially parallel to said axis.

4. The connecting rod of claim 2, wherein said generally common plane defines a predetermined distance from said axis.

5. The connecting rod of claim 2, wherein a first one of said dimples defines a first dimple height that is greater than a second dimple height defined by a second one of said dimples, said first dimple being disposed longitudinally in said bore opening between said second dimple and an axially central portion of said bore opening.

6. The connecting rod of claim 1, wherein said plurality of dimples define progressively smaller heights moving in a direction from an axially central portion of said bore opening toward one of said outer ends of said bore opening.

7. The connecting rod of claim 1, wherein a first one of said dimples defines a first dimple volume that is greater than a second dimple volume defined by a second one of said dimples, said first dimple being disposed longitudinally in said bore opening between said second dimple and an axially central portion of said bore opening.

8. The connecting rod of claim 1, wherein each of said profiled surfaces meet in an axially central portion of said bore opening, each extending therefrom to a respective end of said bore opening.

9. The connecting rod of claim 1, wherein each of said profiled surfaces taper away from said axis moving in a direction from an axially central portion of said bore opening toward the respective opposing end of said bore opening.

10. The connecting rod of claim 1, wherein said plurality of dimples extend circumferentially about at least a portion of said bore opening.

11. A method of making a connecting rod, comprising:
    providing a shaft having a piston pin end and a crankshaft pin end;
    forming a bore opening in said piston pin end, said bore opening extending along an axis and defining an integral bore surface extending about an inner circumference of said bore opening;
    removing material from the bore surface to define a plurality of dimples extending axially along said bore opening; and
    profiling opposing ends of said bore surface.

12. The method of claim 11, wherein said forming of said plurality of dimples is done prior to profiling said opposing ends of said bore opening.

13. The method of claim 11, further comprising establishing a generally common plane with a bottommost portion of at least a subset of each of said dimples.

14. The method of claim 11, further comprising establishing a first dimple height of a first one of said dimples as greater than a second dimple height of a second one of said dimples; and establishing said first dimple as disposed longitudinally within said bore opening between said second dimple and an axially central portion of said bore opening.

15. The method of claim 11, establishing said plurality of dimples with progressively smaller heights moving in a direction from an axially central portion of said bore opening toward one of said outer ends of said bore opening.

16. The method of claim 11, further comprising establishing a first dimple volume of a first one of said dimples as greater than a second dimple volume of a second one of said dimples; and establishing said first dimple as disposed longitudinally within said bore opening between said second dimple and an axially central portion of said bore opening.

17. The method of claim 11, establishing each of said profiled surfaces as meeting in an axially central portion of said bore opening and extending therefrom to a respective end of said bore opening.

18. The method of claim 11, establishing each of said profiled surfaces as tapering away from said axis moving in a direction from an axially central portion of said bore opening toward the respective opposing end of said bore opening.

19. The method of claim 11, establishing said plurality of dimples as extending circumferentially about at least a portion of said bore opening.

20. A piston assembly, comprising:
    a connecting rod, including:
        a shaft extending between a piston pin end and a crankshaft pin end, said piston pin end defining a bore opening extending along an axis; and
        a bore surface formed integrally with said piston pin end and extending about an inner circumference of said bore opening, said bore surface defining a plurality of dimples extending axially along said bore surface;
        wherein said bore opening includes profiled surfaces adjacent opposing ends of said bore opening;
    a piston defining a piston bore; and
    a piston pin selectively extending through said bore opening of said connecting rod and said piston bore, thereby securing said connecting rod to said piston.

21. The piston assembly of claim 20, wherein a first one of said dimples defines a first dimple volume that is greater than a second dimple volume defined by a second one of said dimples, said first dimple being disposed longitudinally in said bore opening between said second dimple and an axially central portion of said bore opening.

* * * * *